United States Patent [19]

Kumata et al.

[11] Patent Number: 4,508,793
[45] Date of Patent: Apr. 2, 1985

[54] AIR-COOLED FUEL CELL SYSTEM

[75] Inventors: Masao Kumata, Neyagawa; Noriaki Matsuoka, Yawata, both of Japan

[73] Assignee: Sanyo Electric Co., Ltd., Moriguchi, Japan

[21] Appl. No.: 528,443

[22] Filed: Sep. 1, 1983

[30] Foreign Application Priority Data

Sep. 8, 1982 [JP] Japan .................... 57-157133
Jun. 20, 1983 [JP] Japan .................... 58-111322
Jun. 30, 1983 [JP] Japan .................... 58-119801

[51] Int. Cl.³ .............................. H01M 8/04
[52] U.S. Cl. ............................... 429/26; 429/35; 429/39
[58] Field of Search ............. 429/26, 34, 35, 38, 429/39, 72, 41, 120

[56] References Cited

U.S. PATENT DOCUMENTS

| | | | |
|---|---|---|---|
| 4,192,906 | 3/1980 | Maru | 429/13 |
| 4,276,355 | 6/1981 | Kothmann | 429/26 |
| 4,310,605 | 1/1982 | Early et al. | 429/26 X |
| 4,324,844 | 4/1982 | Kothmann | 429/26 |
| 4,444,851 | 4/1984 | Maru | 429/26 |

Primary Examiner—Anthony Skapars
Attorney, Agent, or Firm—Wegner & Bretschneider

[57] ABSTRACT

An air-cooled fuel cell system comprises a cell stack including substacks and cooling plates arranged between neighbouring two substacks, each substack comprising a plurality of unit cells, and bipolar plates each having fuel channels and process air channels and being arranged between two unit cells, said unit cells and bipolar plates being arranged in a stack and electrically connected in series. The fuel cell system further comprises a process air inlet manifold mounted on one peripheral face of the cell stack where inlets of said process air channels are opened, a cooling air manifold mounted on said process air inlet manifold, said cooling plates extending from the peripheral face of the cell stack and passing through the process air manifold in such a manner that the cooling air passages provided therein are communicated with said cooling air manifold.

9 Claims, 16 Drawing Figures

AIR-COOLED FUEL CELL SYSTEM

FIELD OF THE INVENTION

This invention relates to air-cooled fuel cell systems. More particularly, it relates to air-cooled fuel cell systems of the type wherein cooling air and process air are separately supplied to a fuel cell.

DESCRIPTION OF THE PRIOR ART

There have been known fuel cell systems comprising a plurality of unit cells each including an electrolyte matrix placed between two gas-diffusion-electrodes, i.e., an anode and a cathode, and a plurality of bipolar plates each being arranged between neighbouring two unit cells for the supply of a fuel and an oxidant to said electrodes, said unit cells and bipolar plates being arranged in a stack. A fuel cell system using phosphoric acid as electrolyte must be kept at a temperature ranging from 150° to 200° C. to maintain its proper operations. However, the fuel cell reaction is exothermic, so that the fuel cell system requires auxiliary equipment for cooling.

Most fuel cells mentioned above are classified into two groups, i.e., air-cooled systems and water-cooled systems. The air-cooled systems have the advantages of a simple construction and low manufacturing cost, as compared with water-cooled systems. Because, the latter requires provision of a plurality of pipings in the cell stack to introduce cooling water, making the system complicate and expensive. The air-cooled fuel cell systems have been proposed and described, for example, in U.S. Pat. Nos. 4,192,906 and 4,276,355. In such air-cooled fuel cell systems, a plurality of cooling plates or modules are arranged between two substacks or every several unit cells in the cell stack, and cooling air is caused to flow through passages provided in the cooling plates to keep the cell operating temperature in the above range.

In the fuel cell systems, so-called DIGAS system, such as that described in U.S. Pat. No. 4,192,906, the process air and cooling air are fed to a common input manifold, and flow into process air channel passages of the bipolar palates and cooling air passages of the cooling plate through said common manifold. Such fuel cell systems have the advantage that configurations of channels and passages are simple, thus making it easy to manufacture. It is, however, impossible to independently control an amount of air required for thermal control and that required for the fuel-cell reaction, making control of heat-balance in the stack considerably difficult.

In the fuel cell systems, so-called separate-cooling system, such as that described in U.S. Pat. No. 4,276,355, the cooling air is introduced into the cell stack separately from the process air. Such fuel cell systems comprises a cell stack 1 and three pairs of manifolds mounted on the respective pairs of opposite peripheral faces of the stack 1, i.e., inlet and outlet manifolds 2a, 2a' for process air, inlet and outlet manifolds 2b, 2b' for process fuel, and inlet and outlet manifolds 2c, 2c' for cooling air, as shown in FIGS. 1A and 1B. The process air and cooling air are separately supplied to the cell stack 1 through the manifolds 2a and 2c, thus making it easy to control heat-balance. However, such a system has the disadvantage that the configurations of passages for process gases and cooling gas are complicated, thus making it difficult to manufacuture bipolar plates (or separating plates) and cooling plates. In addition, the complicated configuration of the passages result in increase of energy loss, and thus the fuel cell system requires a blower with large capacity.

SUMMARY OF THE INVENTION

It is therefore an object of the present invention to provide a fuel cell of a separate cooling system with a simple construction.

Another object of the present invention is to provide a fuel cell of a separate cooling system that can be manufactured by a little modification of a fuel cell stack used for DIGAS fuel cell system.

Still another object of the present invention is to provide a fuel cell system which is easy in thermal control and scarcely has internal temperature gradients.

According to the present invention there is provided an air-cooled fuel cell system comprising a cell stack including substacks and cooling plates arranged between neighbouring two substacks; each of said substacks comprising a plurality of unit cells each including an electrolyte matrix placed between two electrodes of a gas-diffusion-type, and bipolar plates each having fuel channels and process air channels and being arranged between two unit cells; said unit cells and bipolar plates being arranged in a stack and electrically connected in series; said cooling plates having passages for cooling air; said fuel cell system being characterized in that the system further comprises a process air inlet manifold mounted on one peripheral face of the cell stack where inlets of said process air channels are opened, a cooling air manifold mounted on said process air inlet manifold, said cooling plates extending from the peripheral face of the cell stack and passing through the process air manifold in such a manner that the cooling air passages provided therein are communicated with said cooling air manifold.

In one preferred embodiment of the present invention, the process air inlet manifold is provided with air holes in its one side wall, and an auxiliary inlet manifold for process air is mounted on said one side of the process air inlet manifold. The auxiliary inlet manifold is communicated with said process air inlet manifold through the air holes. The air holes are respectively located in the positions corresponding to those of the substacks. In a modified fuel cell system, pipes having a plurality of air blow holes are arranged parallel to the pheripheral face of the stack within the process air inlet manifold to uniformly supply the process air to the process air channels provided in the bipolar plate. Preferably, the pipe is provided with spaced air blow holes in a row along its length, and connected at its one end to the side wall of the process air inlet manifold so that the air blow holes face the front wall of the process air inlet manifold. The other end of the pipe is closed by a plug or the opposite side wall of the process air inlet manifold. The air blow holes may be formed in such a manner that they becomes smaller diameter step by step as the distance from the inlet of the pipe increases.

In another preferred embodiment, a fuel cell system comprises inlet and outlet manifolds for process air, and inlet and outlet manifolds for cooling air which are respectively mounted on the inlet and outlet manifolds for process air. In an alternate form, the outlet manifold for cooling air may be mounted on the inlet manifold for process air, and the inlet manifold for cooling air may be mounted on the outlet manifold for process air to minimize temperature difference throughout the cell stack. In this modification, process air and cooling air are caused to flow in opposite directions, i.e., in a counterflow.

In still another preferred embodiment, the inlet manifold for process air is provided, in its front wall, with holes having dimensions greater than that of the projecting portions of the cooling plates that extends therethrough. The front wall comprises a metal front plate and a sealing plate formed on the front plate of the process air inlet manifold and having flanged holes with dimensions smaller than that of the projecting portions.

DESCRIPTION OF THE PREFERRED EMBODIMENTS

Figure 1A:
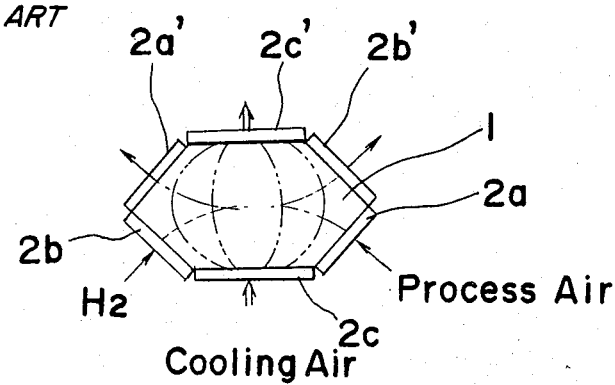
FIGS. 1A and 1B are schematic plan views of air-cooled fuel cell system of the prior art, showing a flow of process gases and cooling gas.
Figure 1B:
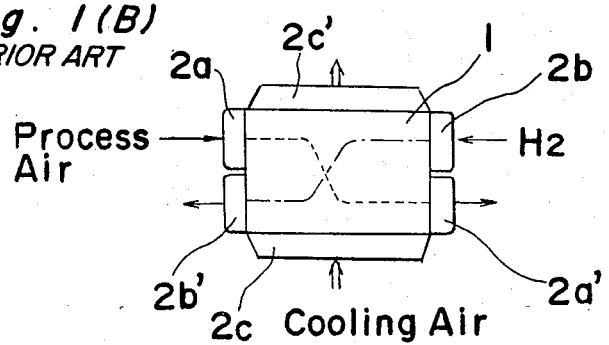
Figure 2:
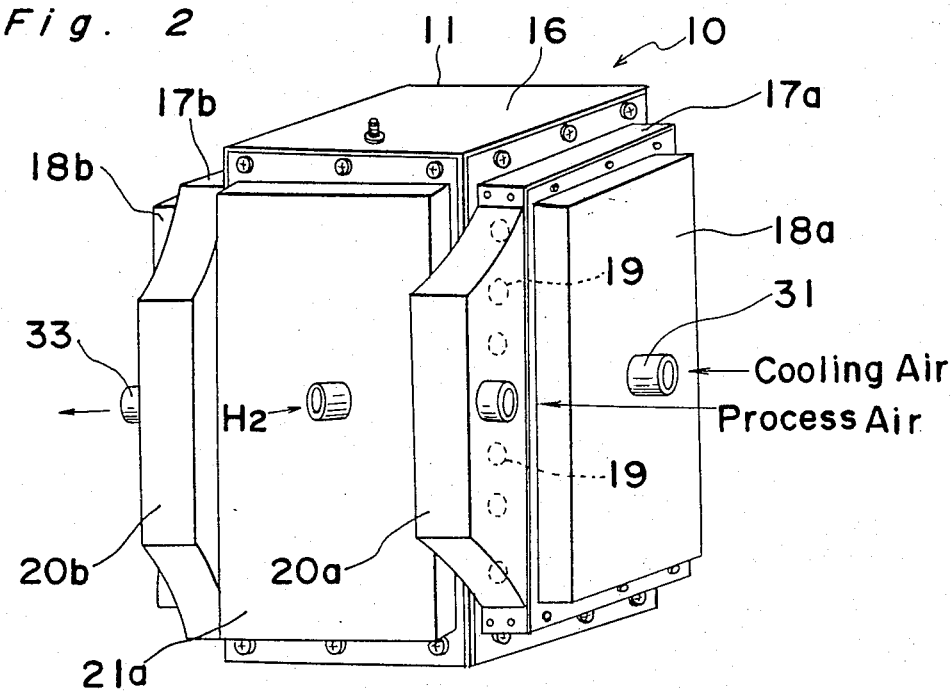
FIG. 2 is a perspective view of a fuel cell system according to the present invention.
Figure 3:
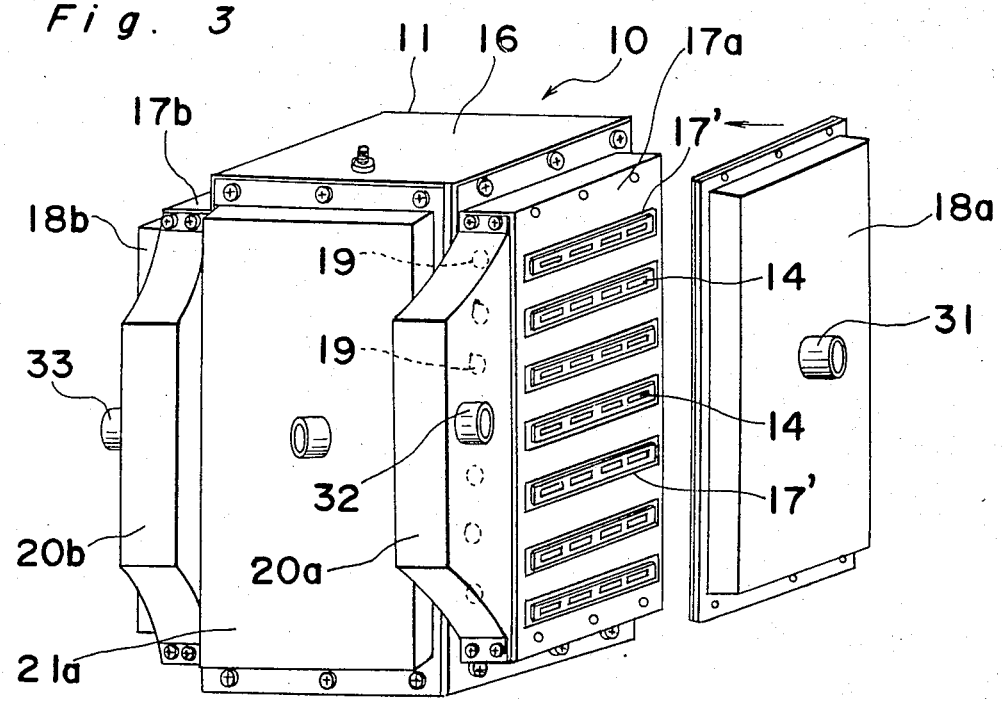
FIG. 3 is a partially exploded perspective view of the fuel cell system of FIG. 2.

Referring now to FIGS. 2 to 5, there is shown a fuel cell system 10 according to the present invention, which comprises a fuel cell stack 11, inlet and outlet manifolds 17a, 17b for process air mounted on a pair of opposite peripheral faces of the stack 11, inlet and outlet manifolds 21a, 21b (not visible) for a fuel mounted on another pair of opposite peripheral faces perpendicular to the aforesaid pair of the peripheral faces of the stack 11. In accordance with the present invention, inlet and outlet manifolds 18a, 18b for cooling air are respectively mounted on the process air manifolds 17a, 17b.

The cell stack 11 comprises a plurality of unit cells 12 and bipolar plates 13, which are stacked alternately, and divided into several substacks 11' by cooling plates 15. The cooling plates 15 are generally arranged every several unit cells 12 in the stack 11 so that each substack 11' includes four or five unit cells 12. The stack 11 includes end plates 16 respectively arranged on the top of the uppermost substack 11' and beneath the bottom of the lowermost substacks 11', and fastened tight by clamping means (not shown).

Figure 5:
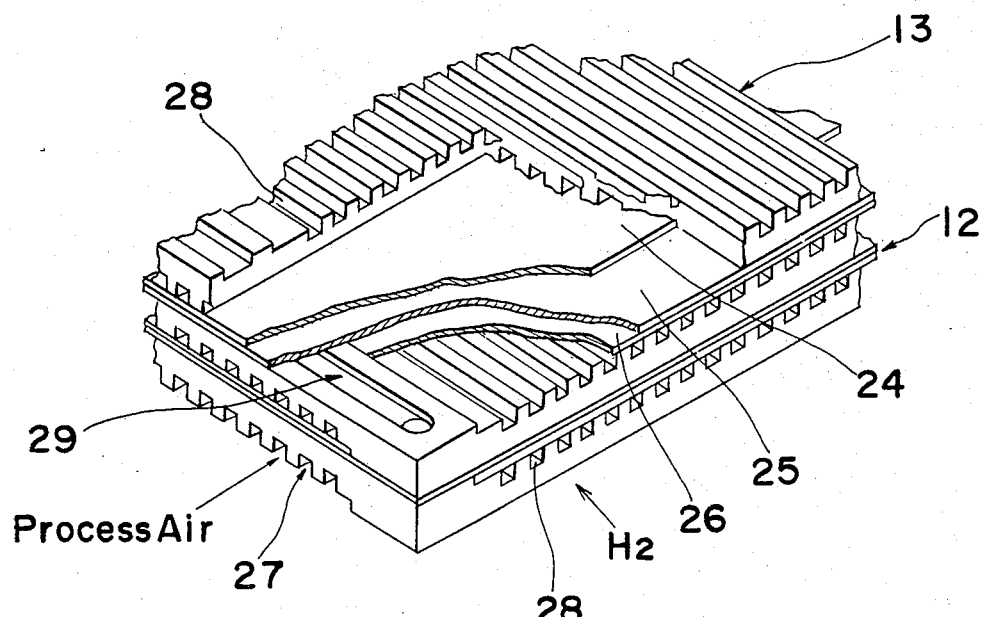
FIG. 5 is a partially cutaway view of the fuel cell stack of FIG. 4.

As shown in FIG. 5, each unit cell 12 includes an electrolyte matrix 25 sandwiched between two electrodes, i.e., a positive electrode(cathode) 24 and a negative electrode(anode) 26, which are made of a carbon material.

The bipolar plates 13 are also made of a carbon material and provided with a plurality of parallel process gas channels 27, 28 with a rectangular cross section. The process fuel gas channels 28 are provided in the opposite side of the bipolar plate 13 in the direction perpendicular to that of the process air channels 27. A fuel such as hydrogen is supplied to the negative electrodes 26 through the channels 28 while process air is supplied to the positive electrodes 24 through the channels 27. The bipolar plate 13 is provided with a groove 29 for adding electrolyte such as phosphoric acid to make up the loss due to evaporation.

Figure 4:
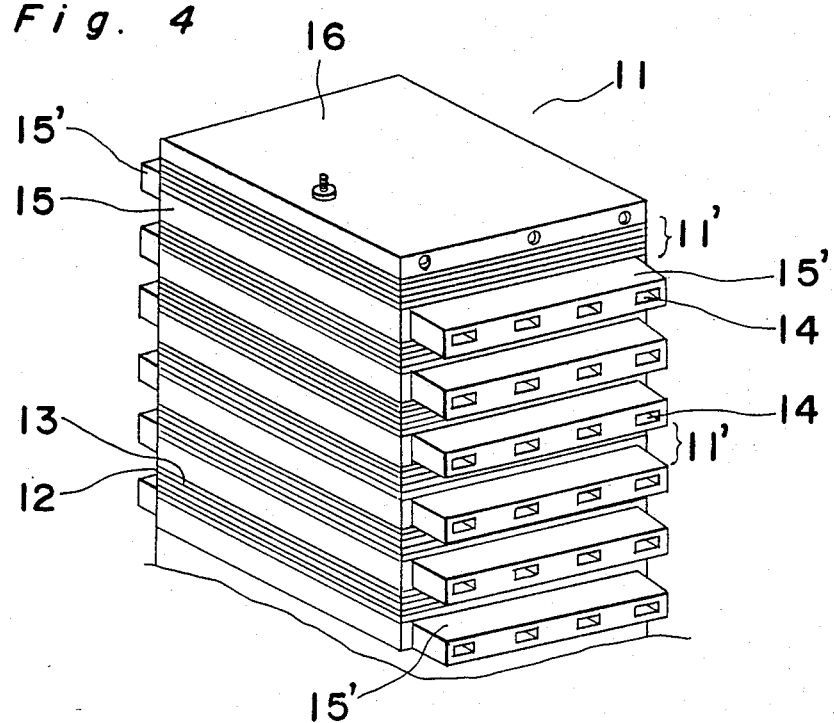
FIG. 4 is a perspective view of a cell stack for the fuel cell system of FIG. 2.

As shown in FIG. 4, each cooling plate 15 is provided with a plurality of parallel cooling-air passages 14 extending from its one end to the other end, and has projecting portions 15' at its both ends where the passages 14 are opened. The cooling plate is also provided with a plurality of parallel process gas channels as well as the bipolar plate. The cooling plates 15 are arranged in the stack 11 in such a manner that the passages 14 and process air channels thereof are parallel to the process air channels 27 of the bipolar plates 13 and that the projecting portions 15' project over the peripheral faces of the stack 11 and extend into the manifolds 18a and 18b through front walls of the manifolds 17a and 17b. The cooling plate 15 is insulated form the manifolds 17a, 17b to prevent short circuit.

Figure 9:
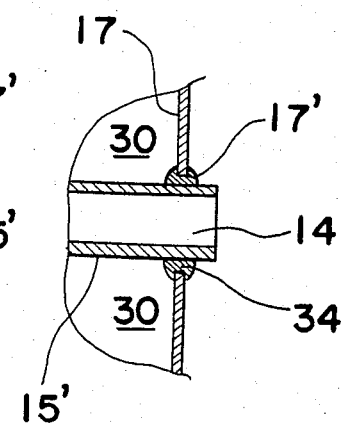
FIG. 9 is a sectional view taken on line A—A of FIG. 8.
Figure 15:
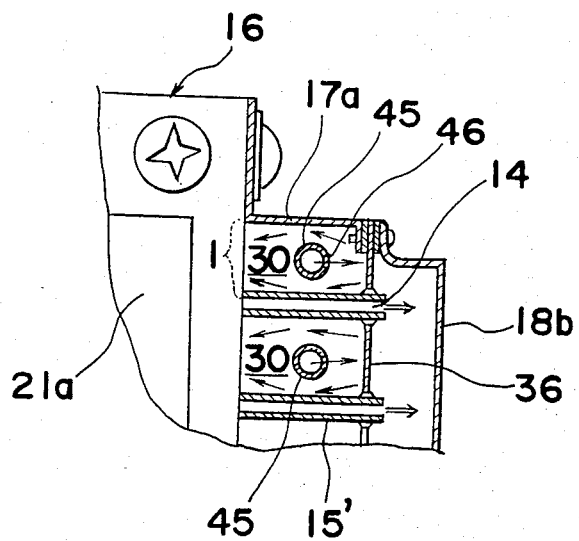
FIG. 15 is a longitudinal sectional view of the selected portion of the fuel cell system of FIG. 14.

The inlet and outlet manifolds 17a, 17b for process air are provided with air holes 19 in their one side wall, and auxiliary manifolds 20a, 20b are respectively mounted on the respective side walls of the inlet and outlet manifolds 17a, 17b so that they cover the air holes 19 of the inlet and outlet manifolds 17a, 17b. As illustrated in FIGS. 9 and 15, the interior of the process air manifolds 17a, 17b are partitioned into several air chambers 30 by the projecting portions 15' of the cooling plates 15, and each of the air chamber 30 communicates with the inlet and outlet manifolds 20a, 20b through the air holes 19, but is isolated from the space of the cooling air manifolds 18a, 18b by a suitable sealing means 34.

In operation, cooling air is fed to the inlet manifold 18a through a pipe 31, flows through the cooling air passages 14 of the cooling plates 15, and then flows out of the fuel cell system through the outlet manifold 18b. During passing through the stack 11, the cooling air absorbs the heat generated by the fuel-cell reaction and its temperature raises to about 180° C. The cooling air discharged from the system is then cooled to about 150° C. by an outer heat exchanger (not shown) and again supplied to the inlet manifold 18a by a blower (not shown). Thus, the fuel cell system can be maintained at a predetermined operating temperature ranging from 180° to 190° C. by adjusting an amount of the cooling air passing through the channels 14 of the cooling plate 15.

On the other hand, process air is supplied to the auxiliary inlet manifold 20a through a pipe 32, flows into the air chambers 30 of the inlet manifold 17a through air holes 19, and then into the process air channels 27 of the bipolar plates 12. The process air is then fed to the positive electrodes 24, where oxygen in the process air is reduced. The air then flows out of the system through the outlet manifold 17b and the auxiliary outlet manifold 20b. Since the process air must be supplied at a temperature of about 150° C. to maintain the fuel cell reaction, it is preferred to preheat the process air by exchanging heat with the discharged cooling air.

Hydrogen is supplied as a fuel to the stack 11 through the fuel inlet manifold 21a, flows into the fuel channels 28 of the bipolar plates 13, and is fed to the negative electrodes 26, where it reacts with oxygen in the process air to generate electric power.

Figure 6:
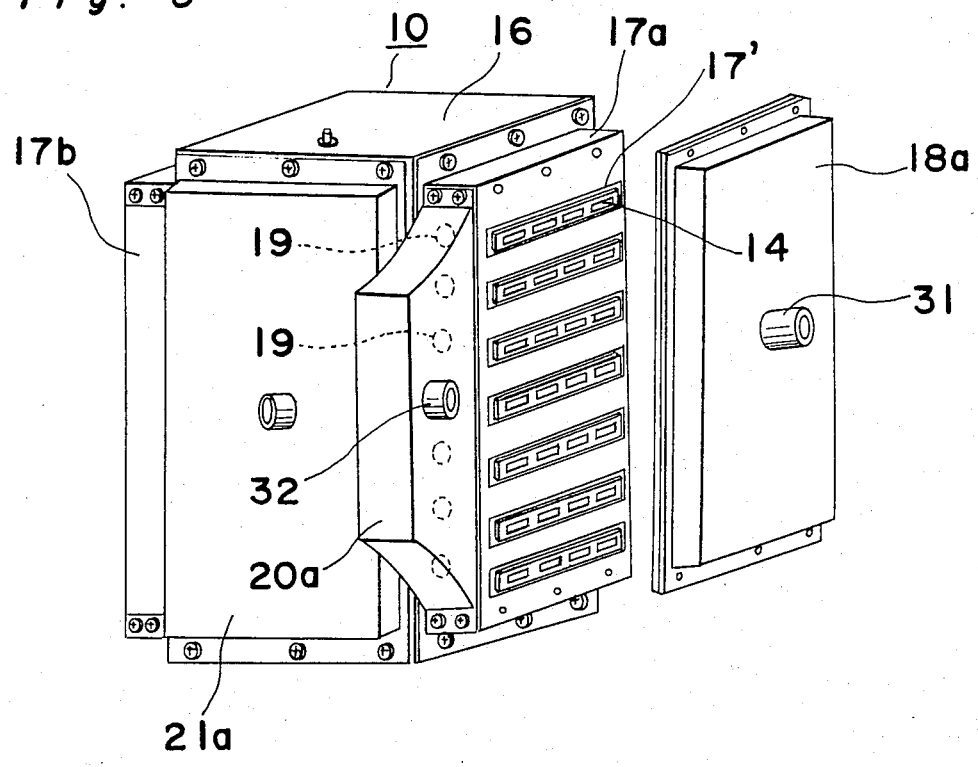
FIG. 6 is a partially exploded perspective view showing another form of a fuel cell system according to the present invention.
Figure 7:
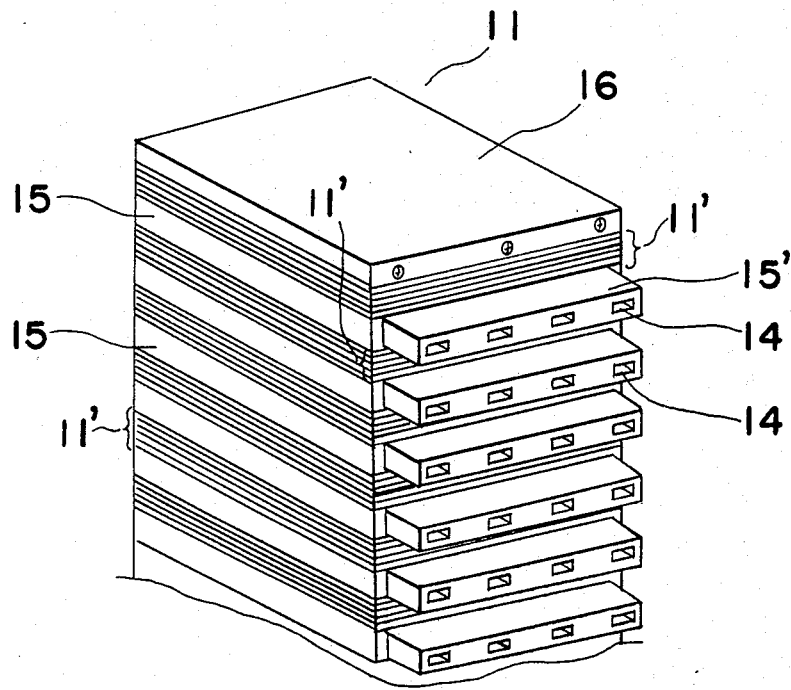
FIG. 7 is a perspective view of a fuel cell stack for the system of FIG. 6.
Figure 8:
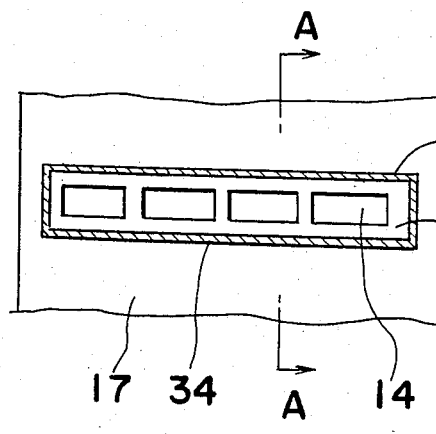
FIG. 8 is a front elevation of a selected portion of the fuel cell system according to the present invention, showing general sealing means.

In the above embodiment, the cooling plates 15 have projections sticked out from the opposite faces of the stack 11, but they may be constructed in such a manner that they stick out only from the process air inlet faces of the stack 11 as shown in FIGS. 6 and 7.

FIGS. 6 and 7 show another form of the fuel cell system according to the present invention. The system has a construction similar to that of the system shown in FIGS. 2 to 5, except for that the cooling plate 15 has a projecting portion 15' only at its one end and that the air outlet manifold 17 has a construction similar to that of the manifold 21a. The passages 14 of the cooling plate 15 open at its outlet to the air outlet manifold 17 so that the process air and cooling air flow out of the system through the outlet manifold 17.

In this embodiment, the process air and cooling air are separately supplied to the stack 11 and their amounts can be adjusted independently, thus making it easy to control heat-balance in the system. On the other hand, the cooling air and process air are discharged through the common outlet manifold 17, thus making it possible to simplify a construction of the air outlet manifolding system of the fuel cell system. In addition, since the amount of cooling air is much greater than that of process air, process air is reduced the pressure at its outlet and drawn out by the cooling air, making the process air flow more smooth.

In the foregoing embodiments, sealing means 34 is formed by applying a sealant such as fluorine-contained rubber (VITON; trademark of Du Pont Corporation) into the clearance between the holes 17' of the manifolds 17a, 17b and the projecting portions 15' of the cooling plate 15. If the number of substacks increases to increase the electromotive force of the fuel cell system, the distance between neighbouring two cooling plates would become ununiform because of an error in measurement in making unit cells and bipolar plates. Thus, if the holes 17' are formed in the process air manifolds 17a, 17b at equal spaces, some of the projecting portions 15' of the cooling plate 15 cannot be inserted in the holes 17' of the process air manifold 17a, 17b. Also, some of the cooling plates would be in contact with the process air manifold 17a, 17b, resulting in short circuiting of the fuel cells. These problems can be solved by provisions of the holes 17' which have dimensions larger than that of the projecting portions 15' of the cooling plate 15. However, the clearances between the hole 17' and the projecting portion 15' increases, thus making it difficult to seal the clearance between them with the above described sealing means. According to the present invention this problem can be solved by a modification of process air manifolds 17a, 17b as shown in FIGS. 10 to 13.

Figure 10:
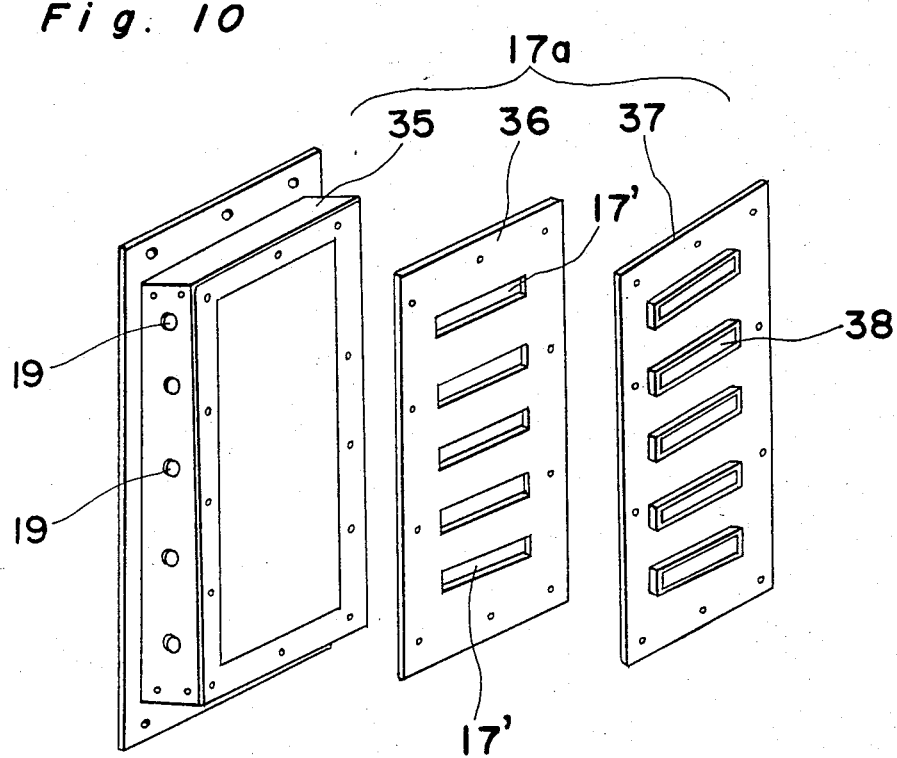
FIGS. 10 and 12 are exploded perspective views of selected portions, showing various modification of a process air manifold construction of the fuel cell system according to the present invention.
Figure 11:
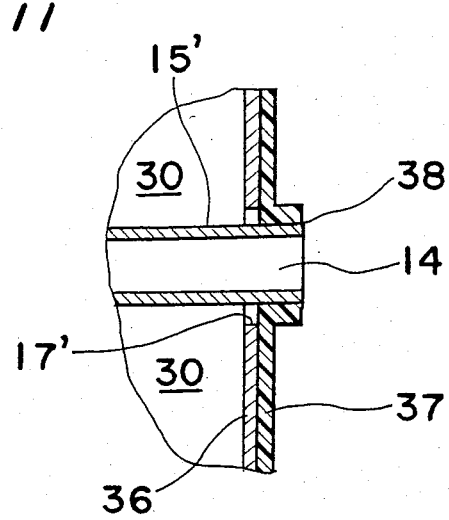
FIGS. 11 and 13 are enlarged sectional views of selected portions, respectively showing sealing means for the corresponding fuel cell systems of FIGS. 10 and 12.

Referring now to FIGS. 10 and 11, there is shown a modified process air manifold 17a for the fuel cell system according to the present invention. The process air manifold 17a comprises a frame 35, a front plate 36 and a sealing plate 37. The frame 35 and front plate 36 are made of a metal, and the front plate 36 is provided with rectangular holes 17' having dimensions greater than that of the projecting portion 15' of the cooling plate 15. The sealing plate 37 is made of a heat-resisting, insulating elastic material such as fluorine-contained rubber and integrally formed on the front plate 36 to form a front wall of the manifold 17a. The sealing plate 37 has flanged holes 38 having dimensions slightly smaller than that of the projecting portion 15' of the cooling plate 15, and the projecting portions 15' and the flanged holes 38 are fitted by force.

Since the sealing plate is made of an elastic material such as fluorine-contained rubber, it is capable of expansion and contraction. Thus, it is possible to achieve complete sealing between the chamber 30 of the process air manifolds and the interior of the cooling air manifolds even if the distances between the neighbouring two cooling plates are different one another. Since the hole (17') size of the plate 36 may be freely determined so as to be adapted to difference of the distance between the two projecting portions 15', the cooling plates are prevented from contact with the manifold. The plate 37 serves as a sealing element between the process air manifolds 17a and cooling air manifold 18a at its circumference.

Figure 12:
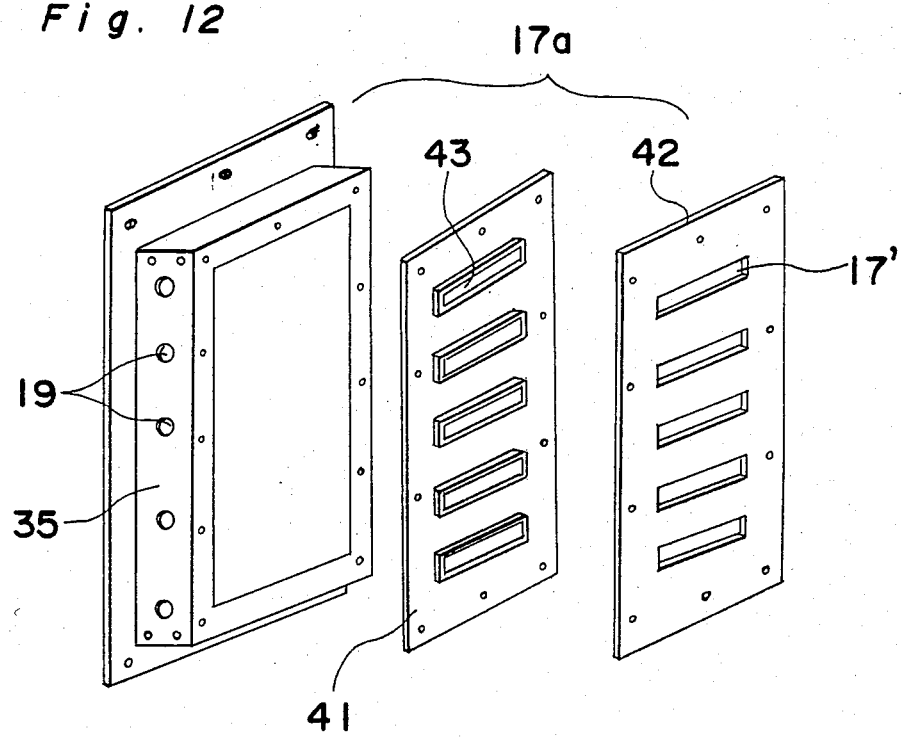
Figure 13:
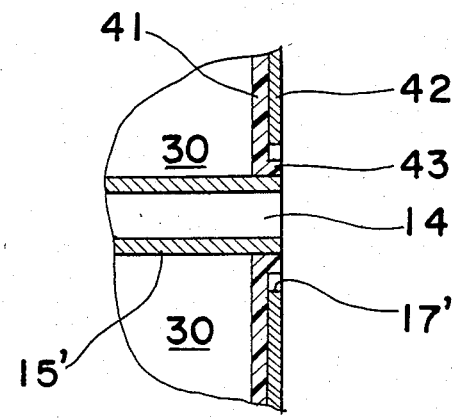

FIGS. 12 and 13 illustrate another form of a process air manifold 17a for the fuel cell system according to the present invention. The process air manifold 17a comprises a sealing plate 41 having flanged holes 43, which is placed between a frame 35 and a front plate 42. The front plate 42 is made of a metal and serves as a reinforcement which prevents the sealing plate 41 from deformation due to difference between the pressure of the cooling air and that of the process air higher than the former.

In this embodiment, the sealing plate 41 and the front plate 42 are reversed the order in contrast with the embodiment of FIGS. 10 and 11, but the same results can be obtained.

In the foregoing embodiment of the FIGS. 2 to 5, the process air is fed to the air chamber 30 in the direction perpendicular to axes of the channels 27, thus making it difficult to feed the process air to the channels 27 uniformly. Particularly, this problem occurs when an amount of the process air is small. Because, the amount of the process air passing through the channels remote from the air holes 19 become larger than that of the process air passing through the channels close to the air holes 19. Thus, it is difficult to cause the cell reaction uniformly throughout unit cells in the stack. This problem may be solved by increasing the feeding amount of the process air, but it requires use of a blower with larger capacity.

Figure 14:
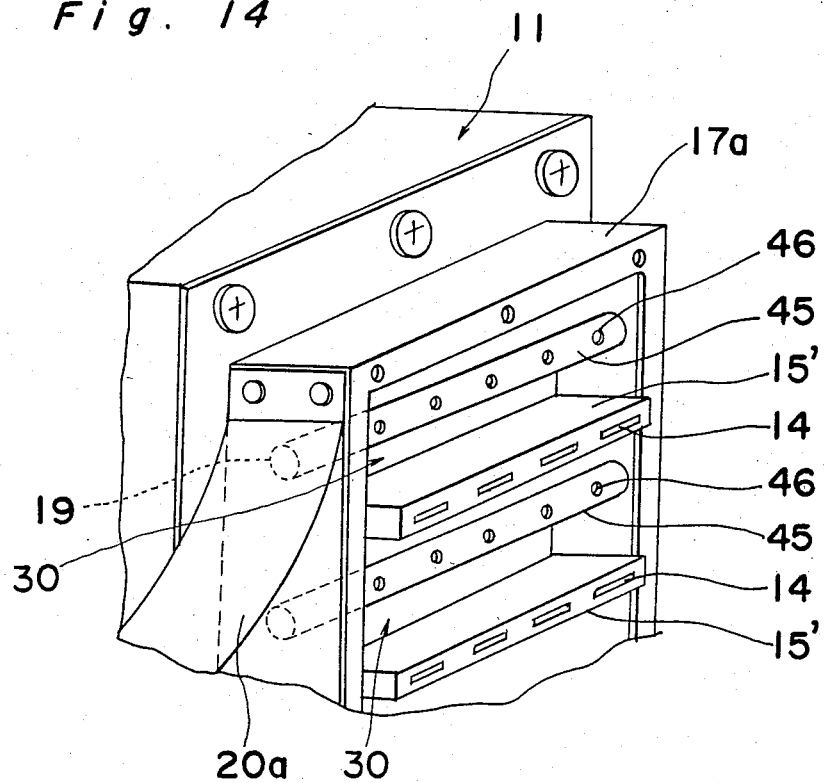
FIG. 14 is an exploded perspective view of a selected portion of a fuel cell system according to the present invention.

According to the present invention, this problem can be solved by provision of an air pipe in each air chamber as shown in FIGS. 14 and 15.

Referring now to FIGS. 14 and 15, there is shown another embodiment of the present invention. The fuel cell system further comprises air pipes 45 having a row of air blow holes 46 along its length. The air pipe 45 is arranged in each air chamber 30 of the process air inlet manifold 17a to feed the process air uniformly into the process air channels opened in rows. Since the interior of the process air manifold 17a is partitioned into several chambers 30 by neighbouring two projecting portions of the cooling plates 5, an air pipe 45 is arranged in each chamber 30 parallel to peripheral face of the substack where the inlets of process air channels are opened. The pipe 45 is provided with plural air blow holes 46 in a line along its length and connected at its one end to the side wall of the inlet manifold 17a. The pipes 45 communicate with the auxiliary manifold 20a through the air holes 19 and are closed at the other end by a suitable plug or the opposite side wall of the manifold 17a. The pipes are arranged so that the air holes 46 face the inner surface of the front wall (36, 41) of the inlet manifold 17a. The process air is blown toward the inner surface of the front wall (36, 41) through the air blow holes 46, reflected from the inner surface of the inlet manifold 17a, and then introduced into the channels, as illustrated in FIG. 15 by arrows. This arrangement enables to unify the air flow in the stacking direction of the substacks.

If all the air blow holes 46 have the same diameter, the amount of the process air blown therethrough is not necessarily uniform, and the amount of the air blown through the air blow holes nearer to the closed end increases as the distance from the open end of the pipe increases. To make the amount of the process air fed to each channel uniform in the horizontal direction, the diameter of the holes is reduced step by step from the open end to the closed end within the range of 7 to 12 mm. The pipe are made of stainless steel or carbon to increase thermal resistance and corrosion resistance.

Since the outlet temperature of the process air is higher than its inlet temperature, the fuel cell stack 11 of the system shown in FIGS. 2 to 5 has internal temperature gradients increasing toward the outlet of the process air.

The internal temperature gradients can be minimized by allowing the cooling air to flow in the direction opposite to that of the process air, as illustrated in FIG. 15. To this end, the outlet manifold 18b for cooling air is mounted on the inlet manifold 17a for process air, while the inlet manifold 18a is mounted on the process air outlet manifold.

It will be understood that there is no need to provide air pipes in the chambers of the process air outlet manifold 17b.

As will be understood from the above, the fuel cell system according to the present invention is far less complicated than the prior art fuel cell system of the separate cooling type. The cell stack for the fuel cell system of the present invention has the same construction as that a cell stack for the DIGAS system has, except for that the cooling plates have projecting portions at its both ends. The configuration of process gas channels and cooling air passages can be simplified as compared with those of the prior art fuel cell stacks of the separate cooling systems. The air for process and cooling flows smoothly in the straight parallel channels and passages, thus making it possible to minimize the capacity of a blower used. The process air can be introduced into the process gas channels uniformly by the provision of air pipes having a row of air blow holes, thus making it possible to prevent the fuel cell system from deterioration of characteristics due to ununiform flow of the process air. Further, the counterflow of the process air and cooling air enables to minimize temperature differences throughout the cell stack, thus making it possible to improve the life characteristics of the fuel cell.

The use of process air manifold comprising a sealing plate and a metal front plate simplifies the assembly of the fuel cell system. Also, when the sealing plate is placed between frame and the metal front plate of the process air manifold, the metal front plate prevents the sealing plate from deformation due to pressure differences between cooling air and process air. If the sealing plate is placed between the metal plate and the inlet manifold for cooling air, it serves as a sealing element, thus making it possible to reduce the number of parts.

What is claimed is:

1. An air-cooled fuel cell system comprising a cell stack including substacks and cooling plate arranged between neighbouring two substacks; each substack comprising a plurality of unit cells each including an electrolyte matrix placed between two electrodes of a gas-diffusion-type, and bipolar plates each having fuel channels and process air channels and being arranged between two unit cells; said unit cells and bipolar plates being arranged in a stack and electrically connected in series; said cooling plates having passages for cooling air; said fuel cell system being characterized in that the system further comprises a process air inlet manifold mounted on one peripheral face of the cell stack where inlets of said process air channels are opened, a cooling air manifold mounted on said process air inlet manifold, said cooling plates extending from the peripheral face of the cell stack and passing through the process air manifold in such a manner that the cooling air passages provided therein are communicated with said cooling air manifold.

2. The fuel cell system according to claim 1 wherein the process air manifold is provided with air holes in its one side wall, and wherein an auxiliary inlet manifold for process air is mounted on said one side wall of the process air manifold and communicated with said process air manifold through said air holes.

3. The fuel cell system according to claim 2 wherein pipes having a plurality of air blowing holes are arranged within the process air inlet manifold, parallel to the peripheral face of the stack where the inlets of said process air channels are opened.

4. The fuel cell system according to claim 3 wherein the pipes are provided with air blow holes in a row along its length and mounted on said one side of the process air manifold such that said air blow holes face the front wall of the process air inlet manifold.

5. The fuel cell system according to claim 3 wherein the air blow holes in the row are reduced in diameter step by step as the distance from the inlet of the pipe increases.

6. The fuel cell system according to claim 1 wherein the outlet manifold for cooling air is mounted on the inlet manifold for process air while the inlet manifold for cooling air may be mounted on the outlet manifold for process air.

7. The fuel cell system according to claim 1 wherein the inlet manifold for process air comprises a front plate and a heat-resisting, insulating sealing plate integrally formed on the front plate, said front plate being provided with holes having dimensions greater than that of the projecting portions of the cooling plates, said sealing plate being provided with flanged holes having dimensions smaller than that of the projecting portions of the cooling plates, said flanged holes and the projecting portions being fitted by force.

8. The fuel cell system according to claim 7 wherein said sealing plate being formed on said front plate such that it serves at its circumference as a sealing element between the cooling air manifold and the process air manifold.

9. The fuel cell system according to claim 1 wherein the front wall of the inlet manifold for process air comprises a front plate and a sealing plate of a heat-resisting, insulating material integrally formed on said front plate, said sealing plate being provided with flanged holes into which projecting portions of the cooling plates are fitted by force, said front plate being provided with holes having dimensions greater than that of the projecting portions of the cooling plates and arranged so as to serve as a reinforcement for the sealing plate.

* * * * *